United States Patent
Martini et al.

(10) Patent No.: US 11,045,998 B2
(45) Date of Patent: Jun. 29, 2021

(54) PRODUCING POWER BUSHING CONDENSER CORE BY ADDITIVE MANUFACTURING

(71) Applicant: ABB Power Grids Switzerland AG, Baden (CH)

(72) Inventors: Harald Martini, Göte borg (SE); Joachim Schiessling, Enköping (SE); Nils Lavesson, Västerås (SE); Cecilia Forssen, Västerås (SE); Håkan Faleke, Väterås (SE); Julia Viertel, Västerås (SE); Lukasz Matysiak, Cracow (PL); Jan Czyzewski, Cracow (PL); Roger Hedlund, Ludvika (SE); Jens Rocks, Freienbach (CH)

(73) Assignee: ABB Power Grids Switzerland AG, Baden (CH)

( * ) Notice: Subject to any disclaimer, the term of this patent is extended or adjusted under 35 U.S.C. 154(b) by 4 days.

(21) Appl. No.: 16/480,605

(22) PCT Filed: Feb. 6, 2018

(86) PCT No.: PCT/EP2018/052856
§ 371 (c)(1),
(2) Date: Jul. 24, 2019

(87) PCT Pub. No.: WO2018/146057
PCT Pub. Date: Aug. 16, 2018

(65) Prior Publication Data
US 2019/0389126 A1    Dec. 26, 2019

(30) Foreign Application Priority Data
Feb. 10, 2017    (EP) .................................... 17155617

(51) Int. Cl.
*B29C 64/118* (2017.01)
*H01B 19/04* (2006.01)
(Continued)

(52) U.S. Cl.
CPC ............ *B29C 64/118* (2017.08); *B29C 64/10* (2017.08); *B29C 64/124* (2017.08); *H01B 19/04* (2013.01); *B33Y 80/00* (2014.12)

(58) Field of Classification Search
CPC ........................... B29C 64/124; B29C 64/118
See application file for complete search history.

(56) References Cited

U.S. PATENT DOCUMENTS

| 6,046,267 A | 4/2000 | Vidaurre et al. |
| 6,519,500 B1* | 2/2003 | White .................... B33Y 80/00 700/119 |
| 2016/0164238 A1* | 6/2016 | Hobson ................... H02G 1/14 29/869 |

FOREIGN PATENT DOCUMENTS

| CN | 104103385 A | 10/2014 |
| CN | 104916378 A | 9/2015 |

(Continued)

OTHER PUBLICATIONS

Extended European Search Report Application No. 17155617.8 completed: Aug. 1, 2017; dated Aug. 10, 2017 7 Pages.
(Continued)

*Primary Examiner* — Nathan T Leong
(74) *Attorney, Agent, or Firm* — Sage Patent Group

(57) ABSTRACT

A method for producing an electrical power device having an insulator. The method includes, by means of additive manufacturing, applying a polymeric insulating material forming part of the device. The method also includes, in a subsequent consolidation step, subjecting the insulator to
(Continued)

elevated temperature and pressure during a predetermined time period to consolidate the insulator.

15 Claims, 2 Drawing Sheets

(51) Int. Cl.
    *B29C 64/10*     (2017.01)
    *B29C 64/124*     (2017.01)
    *B33Y 80/00*     (2015.01)

(56) References Cited

FOREIGN PATENT DOCUMENTS

| | | |
|---|---|---|
| CN | 105144308 A | 12/2015 |
| EP | 1130605 A1 | 9/2001 |
| JP | 2016033861 A | 3/2016 |
| RU | 2432633 C2 | 10/2011 |
| RU | 139426 U1 | 4/2014 |
| WO | 2014090677 A1 | 6/2014 |
| WO | 2016187365 A1 | 11/2016 |
| WO | 2017021429 A1 | 2/2017 |

OTHER PUBLICATIONS

High Voltage Insulator http://www.shapeways.com/product/3VBN7ZFVB/high-voltage-insulator Last accessed: Jul. 24, 2019.
HIP Supporting Additive Manufacturing http://quintustechnologies.com/hot-isostatic-pressing/applications/additive-manufacturing/ Last accessed: Jul. 24, 2019.
Hot and Cold Isostatic Pressing of Ceramics http://www.ceramicindustry.com/articles/95484-hot-and-cold-isostatic-pressing-of-ceramics Last accessed: Jul. 24, 2019.
International Search Report & Written Opinion of the International Searching Authority Application No. PCT/EP2018/052856 Completed: Apr. 20, 2018; dated May 3, 2018 15 Pages.
First Office Action mdated Apr. 1, 2020 for Chinese Patent Application No. 2018800097338, 4 pages.
Office Action dated Mar. 24, 2020 for Russian Patent Application No. 2019126446/07(051848), RU-language and EN-language, 12 pages.

\* cited by examiner

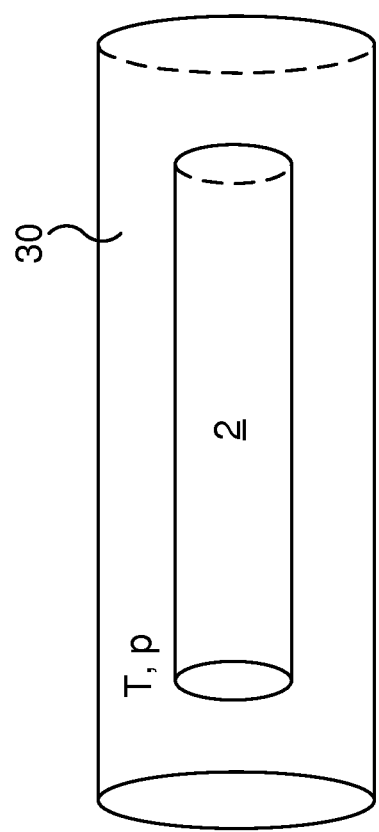

PRODUCING POWER BUSHING CONDENSER CORE BY ADDITIVE MANUFACTURING

TECHNICAL FIELD

The present disclosure relates to a method for producing a condenser core of an electrical power bushing.

BACKGROUND

A wide range of additive manufacturing (also called 3D printing) technologies are commercially available, enabling the production of customized components layer by layer in different materials (e.g. metal, ceramic, plastic and composites). In recent years the production speed (volume/h) and size of building chamber have increased significantly. For example, a new fast Fused Deposition Modeling (FDM) machine using a standard thermoplastic resin is more cost effective.

There is a general trend to replace epoxy insulation in high-voltage (HV) insulation. One example is injection molding of a thermoplastic material. However, injection molding is difficult for thicker insulators.

There are many HV apparatuses with epoxy based (impregnated) insulation that have conductive parts, e.g. power bushings. Several process steps are needed like winding, drying, vacuum impregnation and curing of liquid epoxy resin to form void-free solid insulation bodies. An alternative manufacturing process for dry bushings uses winding polymer film. The polymer film cost/kg is higher than the resin cost, making the process less cost effective.

A bushing is a hollow electrical insulator through which a conductor may pass. Bushings are used where high voltage lines must pass through a wall or other surface, on switchgear, transformers, circuit breakers and other high voltage equipment. A bushing is e.g. used for passing a high voltage line from an oil-filled transformer, whereby the bushing is an oil-to-air bushing with a part in oil in the transformer and a part in air outside of the transformer. Other bushings are air-to-air bushings e.g. passing high voltage lines through a wall.

The condenser core of a power bushing comprises an electrically insulating material having electrically conducting sheets therein to handle the electrical field formed by the HV conductor passing thorough the condenser core.

SUMMARY

Components made by additive manufacturing (3D printing) are generally rather porous, making them unsuitable for use as HV insulation, unless the voids are filled (impregnated) by an electrically insulating fluid, e.g. a liquid such as an oil, or epoxy which is then cured to form a solid.

It has now been found that suitable medium voltage (MV), e.g. above 1 kV, or high voltage (HV), e.g. above 72.5 kV, insulators, e.g. in the form of a condenser core, in a power bushing can be obtained without the need for impregnation with insulating fluid, by using additive manufacturing in combination with a subsequent consolidation step at elevated temperature and pressure. At the elevated temperature, the electrically insulating material softens, allowing the elevated pressure to consolidate the 3D printed insulator (e.g. condenser core), removing any gas-filled (typically air-filled) cavities formed in the insulator during the additive manufacturing, reducing the risk of breakdown of the insulating material or partial discharges.

According to an aspect of the present invention, there is provided a method for producing an electrical power device comprising an insulator. The method comprises, by means of additive manufacturing, applying a polymeric insulating material in the device, to form the insulator in said device. The method also comprises, in a subsequent consolidation step, subjecting the insulator to elevated temperature and pressure during a predetermined time period to consolidate the insulator.

In some embodiments, the insulator is in the form of a condenser core. Such a condenser core may e.g. be produced in accordance with an embodiment of the inventive method, for producing a condenser core of an electrical power device, e.g. a medium or high voltage power bushing. The method may comprise, by means of additive manufacturing, applying an inner concentric layer of the condenser core, of a polymeric insulating material around and along a longitudinal through hole of the device. The method may also comprise applying a first of a plurality of concentric intermediate layers of an electrically conducting material, on top of the inner layer, around and along the longitudinal through hole. The method may also comprise, by means of the additive manufacturing, applying an outer concentric layer of the condenser core, of the polymeric insulating material, on top of a second of the plurality of concentric intermediate layers, around and along the longitudinal through hole. The method may also comprise subjecting the condenser core to elevated temperature and pressure during a predetermined time period to consolidate the condenser core.

According to another aspect of the present invention, there is provided a condenser core produced as the insulator of an embodiment of the method of the present disclosure.

According to another aspect of the present invention, there is provided a high-voltage power bushing comprising an embodiment of the condenser core of the present disclosure.

According to another aspect of the present invention, there is provided a transformer arrangement comprising a transformer tank encasing a transformer and being filled with an electrically insulating liquid. The transformer arrangement also comprises an embodiment of the bushing of the present disclosure arranged through a wall of the transformer tank.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which:

FIG. 3 is a side view in longitudinal section of an embodiment of a consolidation chamber, in accordance with the present invention.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

The insulator is herein exemplified as a condenser core, which is preferred in some embodiments of the present invention. However, the inventive method may also be used for producing other types of electrical insulators, typically for MV or (especially) HV power devices. Examples of other HV and (especially) MV applications of embodiments of the present invention include any of bushing, support insulator, bushing plate, embedded pole or monoblock insulator, e.g. for Gas Insulated Substation (GIS) or Air Insulated Substation (AIS) applications.

The electrical power device may e.g. be a bushing, an instrument transformer or a cable termination, preferably a bushing e.g. a HV bushing which is used as an example herein. The bushing of the present invention may be used for a transformer, e.g. a HV power transformer, as exemplified herein, but the inventive bushing may alternatively be used for other electrical devices, especially gas- or liquid-filled (e.g. oil) electrical devices, such as electrical motors or switches.

The polymeric insulating material is herein exemplified as a thermoplastic material, which is preferred in some embodiments e.g. when using FDM, but in other embodiments, e.g. depending on the additive manufacturing technique used, other polymeric materials such as elastomeric or curable polymeric insulating materials may be used.

Figure 1:
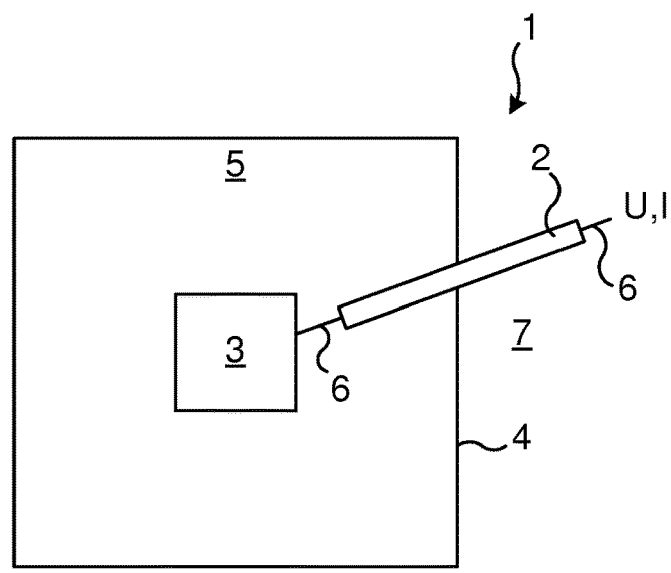
FIG. 1 is a side view in section of an embodiment of a transformer arrangement comprising a HV bushing, in accordance with the present invention.

FIG. 1 is a schematic illustration of a transformer arrangement 1 where a bushing 2, having a longitudinal through hole surrounded by a condenser core and an outer shell, is used for conducting an electrical current (I, U) in a conductor 6 through a wall of the transformer tank 4 to the transformer 3. The transformer tank 4 is (at least partly) filled with an electrically insulating, e.g. dielectric, fluid 5, whereby the bushing extends from the insulating fluid 5 to the ambient fluid (typically air) outside of the tank 4. The transformer may be an oil-filled transformer, e.g. filled with mineral oil or an ester-based oil. The transformer may be a high-voltage power transformer, e.g. having a rating or operating voltage of at least 50 kV, e.g. within the range of 50 200 kV, whereby a high-voltage current is passed from the transformer 3 through the bushing 2 via the conductor 6 passing through the through hole of the bushing. The bushing 2 may thus have an inner oil-immersed part at a lower/bottom end of the bushing inside the transformer tank 4, and an outer part in air at an upper/top end of the bushing outside of the transformer tank. The bushing 2 may be at least partly fluid-filled, typically by the insulating fluid 5, but in accordance with the present invention the condenser core is consolidated and does not need to be impregnated with the insulating fluid. The bushing, by means of its associated conductor 6, may conduct current from e.g. a winding of the transformer 3, through the wall of the transformer tank 4 and to e.g. an air-borne line of a power distribution network, the bushing 2 insulating the current from the wall and any other external structures.

Figure 2:
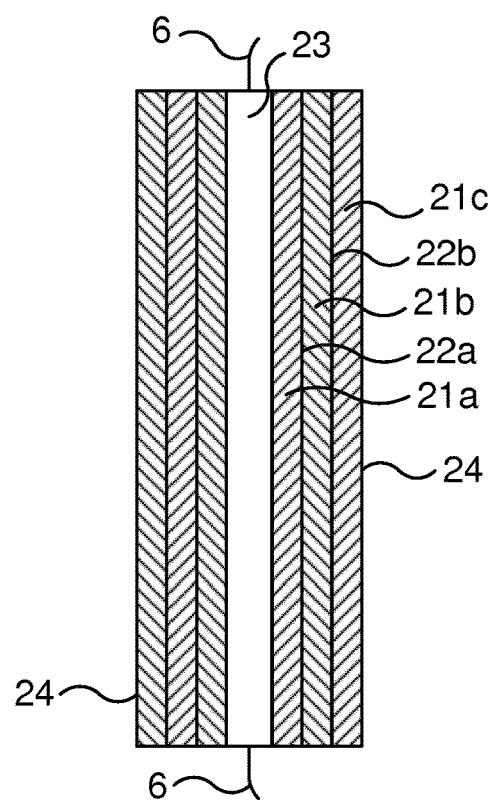
FIG. 2 is a side view in longitudinal section of an embodiment of a HV bushing, in accordance with the present invention.

FIG. 2 illustrates the multi-layer structure of the condenser core of the bushing 2. The condenser core may be regarded as composed by multiple concentrically positioned cylindrical layers with substantially circular cross-sections, adhered to each other and positioned one outside the other such that a plurality of insulating layers 21, applied by means of an additive manufacturing technique, are formed with conducting intermediate layers 22 there between. Any number of alternating insulating layers 21 and conducting layers 22 may be used, depending on the requirements of the bushing 2. In the example of FIG. 2, a relatively small number of layers 21 and 22 are shown, an inner layer 21a of the thermoplastic insulating material, a first intermediate layer 22a of the electrically conducting material, on top of the inner layer 21a, a middle layer 21b of the thermoplastic insulating material on top of the first intermediate layer 22a, a second intermediate layer 22b of the electrically conducting material on top of the middle layer 21b, and an outer layer 21c of the thermoplastic insulating material on top of the second intermediate layer 22b.

The alternating layers 21 and 22 are typically adhered to each other during the production process. The layers 21 of the thermoplastic insulating material are applied, e.g. on top of a conducting intermediate layer 22, by means of an additive manufacturing technique, e.g. FDM which is preferred due to ability to produce large 3D printed objects in relatively short time. The electrically conducting intermediate layers 22 may also be applied, typically at room temperature, using an additive manufacturing technique, plasma deposition, physical or chemical vapor deposition, or by printing, e.g. ink-jet printing, or painting, e.g. with a brush, on the layer of the thermoplastic insulating material on top of which it is applied.

The layers 21 and 22 are formed around and along a central through hole 23 of the bushing 2, through which through hole 23 the conductor 6 may pass. The through hole 23 may be formed by a central pipe of an electrically insulating or conducting material, on to which the inner layer 21a of the thermoplastic insulating material may be applied using additive manufacturing. If the central pipe is of a conducting material, e.g. copper or aluminum, the central pipe may form part of the conductor 6.

An outer casing or shell 24, e.g. of an electrically insulating ceramic, may form an outer surface of the bushing 2 outside of the condenser core.

The operating voltage of the device 2 may be HV of at least 30 or 50 kV, e.g. within a range of 35-400 kV, such as 35-170 kV for e.g. a bushing or 140-400 kV for e.g. a cable termination, which implies that the condenser core is configured for an operating voltage of the bushing of at least 30 kV, e.g. within a range of 35-400 kV such as 35-170 kV or 140-400 kV. The use of HV put some strain on the condenser core which has to be configured to handle the relatively strong electrical field and high temperatures.

The polymeric (e.g. thermoplastic) insulating material has a melting point $T_m$ or glass transition temperature $T_g$ above the operating temperature of the bushing, but below the temperature used to apply the polymeric material by means of the additive manufacturing technique. The operating temperature of the bushing may e.g. be at least 100° C., e.g. at least 120° C., in which case the polymeric (e.g. thermoplastic) material may have a $T_m$ or a $T_g$ of at least 120° C. The additive manufacturing technique may comprise applying the polymeric, e.g. thermoplastic, insulating material at a temperature of at least 150° C. or at least 200° C., e.g. at least 250° C., in which case the polymeric material may have a $T_m$ or $T_g$ of less than 250° C., e.g. less than 200° C. or less than 150° C. Alternatively, the polymeric material may have a $T_g$ which is lower than the temperatures at which the polymeric material has to be handled, e.g. of less than −40° C.

The conducting material of the intermediate layers 22 may be applied in any suitable way, e.g. in a liquid form at room temperature, or by any other way of coating, e.g. ink-jet printing or 3D printing, plasma deposition, physical or chemical vapor deposition, spray coating or painting, e.g. with a brush, or by applying/adhering a conducting foil with adhesive or directly on the insulating material if sticky, on any layer 21 of the polymeric insulating material. The conducting material may e.g. be or comprise silver, aluminum, graphene and/or carbon black in a lacquer which is liquid at room temperature before being applied in the condenser core.

The dimensions of the condenser core depend on the application and the size of the bushing 2. The condenser core of the present invention may be especially suitable for small to medium sized HV bushings, since larger condenser cores may not easily be produced by additive manufacturing or consolidated. The condenser core may e.g. have a longitudinal length of at least 0.5 or 1 m, or of at most e.g. 6 m, e.g. within a range of 0.5-3 m. The condenser core may have a cross-sectional diameter within the range of 7-30 cm e.g. 10-30 cm, depending on the diameter of the through hole 23 and the combined annular wall thickness of the layers 21 and 22 of the condenser core. In some embodiments, the condenser core has a wall thickness, as measured from an inner surface of the inner layer 22a to an outer surface of the outer layer 22c, within a range of 2-10 cm.

FIG. 3 schematically shows an embodiment of the bushing 2, or condenser core thereof, inside a consolidation chamber 30 configured for consolidating the condenser core after it having been formed by applying the layers 21 and 22. The consolidation chamber may be substantially cylindrical, e.g. having a substantially circular cross-section, and large enough to be able to enclose the condenser core. The consolidation chamber is configured to apply an elevated temperature T and an elevated pressure p within the chamber 30 to consolidate the condenser core. The elevated temperature is preferably within the range of above $T_g$ and below $T_m$ of the polymeric material, and the elevated pressure may e.g. be within the range of 1.0-10 bar. The consolidation chamber 30 may e.g. be configured for isostatic pressing. By means of the elevated T and P, cavities and air bubbles may be removed from the condenser core, reducing the risk of flash-overs and improving the insulation properties of the condenser core without the need for impregnation with e.g. oil or epoxy for HV applications.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method for producing an electrical power device comprising an insulator, the method including:

by means of additive manufacturing, applying a polymeric insulating material in the device, to form the insulator in the device;

in a subsequent consolidation step, subjecting the insulator to elevated temperature and pressure during a predetermined time period to consolidate the insulator;

by means of the additive manufacturing, applying an inner concentric layer of the condenser core, of the polymeric insulating material around and along a longitudinal through hole of the device;

applying a first of a plurality of concentric intermediate layers of an electrically conducting material, on top of the inner layer, around and along the longitudinal through hole; and by means of the additive manufacturing, applying an outer concentric layer of the condenser core, of the polymeric insulating material, on top of a second of the plurality of concentric intermediate layers, around and along the longitudinal through hole; before subjecting the condenser core to the elevated temperature and pressure during the predetermined time period to consolidate the condenser core.

2. The method of claim 1, wherein the electrically conducting intermediate layers are applied by coating, ink jet printing or 3D printing, plasma deposition, physical or chemical vapor deposition, spray coating or painting, with a brush, or by adhering a conducting foil, on any layer of the polymeric insulating material.

3. The method of claim 2, wherein the condenser core is configured for an operating voltage of the device of at least 30 kV or within a range of 35-400 kV, 35-170 kV, or 140-400 kV.

4. The method of claim 2, further comprising arranging the condenser core in a high-voltage bushing, an instrument transformer or a cable termination.

5. The method of claim 1, wherein the condenser core is configured for an operating voltage of the device of at least 30 kV or within a range of 35-400 kV, such as 35-170 kV, or 140-400 kV.

6. The method of claim 1, further comprising arranging the condenser core in a high-voltage bushing, an instrument transformer or a cable termination.

7. The method of claim 6, further comprising arranging the bushing through a wall of a transformer tank.

8. The method of claim 1, wherein the method includes forming the insulator in the form of a medium voltage insulator, a bushing, support insulator, bushing plate, embedded pole or monoblock insulator.

9. The method of claim 1, wherein the additive manufacturing includes Fused Deposition Modelling, FDM.

10. The method of claim 1, wherein the polymeric insulating material is a thermoplastic material.

11. The method of claim 1, wherein the additive manufacturing includes applying the polymeric insulating material at a temperature of at least 150 degree C.

12. The method of claim 1, wherein the polymeric insulating material has a glass transition temperature, T.sub.g, of at least 120 degree C. or less than 40 degree C.

13. The method of claim 1, wherein the electric power device is a bushing, an instrument transformer or a cable termination.

14. The method of claim 1, wherein the additive manufacturing includes Fused Deposition Modeling, FDM.

15. The method of claim 1, wherein the polymeric insulating material is a thermoplastic material.

* * * * *